United States Patent
Holdredge (10) Patent No.: US 10,143,121 B2
(45) Date of Patent: Dec. 4, 2018

(54) GARDEN TOOL

(76) Inventor: Randolph Artemas Holdredge, West Burlington, NY (US)

( * ) Notice: Subject to any disclaimer, the term of this patent is extended or adjusted under 35 U.S.C. 154(b) by 737 days.

(21) Appl. No.: 12/488,888

(22) Filed: Jun. 22, 2009

(65) Prior Publication Data

US 2010/0319943 A1  Dec. 23, 2010

(51) Int. Cl.
*A01B 1/08* (2006.01)
*A01B 1/18* (2006.01)

(52) U.S. Cl.
CPC .................. *A01B 1/08* (2013.01); *A01B 1/18* (2013.01); *Y10T 29/49826* (2015.01)

(58) Field of Classification Search
CPC ........................................................ A01B 1/08
USPC .................. 172/371, 372, 378, 381
See application file for complete search history.

(56) References Cited

U.S. PATENT DOCUMENTS

| | | | | |
|---|---|---|---|---|
| 83,290 A | * | 10/1868 | King | 172/381 |
| 355,182 A | * | 12/1886 | Lefavour | 172/371 |
| D25,918 S | * | 8/1896 | Hepsher | D8/11 |
| 685,209 A | * | 10/1901 | Hoodless | 172/378 |
| 946,566 A | * | 1/1910 | Shaw | 172/381 |
| 984,817 A | * | 2/1911 | Jennings | 172/371 |
| 1,185,581 A | * | 5/1916 | Beymer | 172/381 |
| 1,224,957 A | * | 5/1917 | Robinson | 172/381 |
| 1,279,704 A | * | 9/1918 | Jones | 172/371 |
| 3,841,414 A | | 10/1974 | Perkins | |
| 3,847,226 A | * | 11/1974 | Long | 172/371 |
| 3,942,591 A | * | 3/1976 | Brannin | 172/371 |
| 4,093,031 A | | 6/1978 | Portz | |
| 4,177,864 A | | 12/1979 | Donnini | |
| 4,546,831 A | * | 10/1985 | Albertson | 172/13 |
| 4,611,666 A | * | 9/1986 | Albertson | 172/13 |
| 5,390,746 A | * | 2/1995 | Page | 172/371 |
| 6,470,972 B1 | | 10/2002 | Trampe | |
| 6,988,561 B1 | * | 1/2006 | Campbell | 172/380 |

OTHER PUBLICATIONS

Johnny's Selected Seeds, catalog 2009, p. 188, Item A 9374, Tools & Supplies, Hand Tools, Johnnyseeds.com.

* cited by examiner

*Primary Examiner* — Thomas B Will
*Assistant Examiner* — Joel F. Mitchell
(74) *Attorney, Agent, or Firm* — Blank Rome LLP (57) ABSTRACT

A hand held tool for gardens, landscapes and the like; comprising a handle, and a tool head. The tool head is formed from a flat blade that has tapers and is bent in substantially a "J" shape that is beveled along a portion of its edges. The open end of the "J" has a beveled tip, preferably containing a center notch. The bent, closed portion of the "J" shape is beveled at least 50% and forms a heel. The short leg of the "J" forms a flange, which is preferably not beveled and provides an area for attaching the tool head to the handle, preferably via a tang. The blade width is generally four or more times wider than the thickness of the blade material.

17 Claims, 4 Drawing Sheets

GARDEN TOOL

FIELD OF INVENTION

The invention relates to a hand held garden tool that incorporates features of weeders, edgers, cultivators, and hoes all in a single garden tool.

BACKGROUND OF THE INVENTION

It takes time to establish a garden or to landscape an area. The pride one takes in a bountiful garden, or a well manicured landscape, should not be overshadowed by the task of weeding. Tools come to the aid of home gardeners and landscapers, so that they can perform specific tasks when working the earth. Some tools may be used in gardens for planting, cultivating or weeding. In landscaping, there are tools that may be used for weeding, edging or contouring.

Dibbles are used for planting bulbs. Spades are used when digging holes for smaller plants. A hoe with a rectangular blade is used for making furrows when planting seeds, making a hole, hilling the soil, and chopping weeds.

After the initial establishment of a garden, the greatest amount of time spent by the gardener is the time spent weeding. Weeds detract from the appearance of gardens and landscapes. They absorb the moisture, nutrients, and sunlight that the plants need to flourish.

In a perfect world, weeds are attacked early before their root system can become well established. A cultivator type tool is useful when the weeds first appear. This loosens and aerates the soil. It disturbs the root system of the weeds, causing them to dry out which kills the weeds. Between rows in open areas, a powered tiller might be used, but is usually too large to weed around plants. Hand tools give the user greater control in getting rid of the weeds. They allow for more precise weeding, especially around plants that are close together.

Many of the available hand tools are inefficient because they are useful for one or two specific tasks. A loop-type hoe can be used in open areas to cultivate the soil and remove weeds. A garden tool with a pointed tip removes weeds that are very close to the plants.

Gardeners should not have to carry multiple tools to accomplish these various tasks. The tools used should shorten the time spent tending to the garden and allow more time to enjoy the fruits of one's labor. Tools should be easy to use, versatile and efficient when weeding, cultivating, and performing general maintenance of gardens and landscapes.

U.S. Pat. No. 4,093,031, issued to William E. Portz on Jun. 6, 1978, shows a pendulum, closed-loop type hoe. It moves a stirrup-shaped blade that is sharpened on both sides, forward and backward through the ground. The tool head is attached to an elongated, cylindrical handle. The closed-loop design makes it difficult to weed between tightly spaced plants. The blade being very thin and articulated makes this tool unsuitable in weeding situations that require a chopping action. When used for cultivating, the articulated blade abruptly stops when a rock is encountered and then transfers the shock up through the handle. The tool automatically adjusting the blade angle causes a jerking sensation with an accompanying rattling noise.

U.S. Pat. No. 6,470,972 B1, issued to Leslie O. Trampe on Oct. 29, 2002, depicts an implement where the round shaft coming out of the handle has two angles. At the point of the second bend, the round shaft is flattened and terminates in a V-notch (teeth) which are sharpened. The main function of this tool is for weeding. It lacks suitability for other functions such as cultivating open areas, making furrows for planting, or edging. Using tools with a single purpose requires purchasing, and transporting more tools than one would like. The sharpened V-notch is designed to cut the weed, rather than to capture it, for pulling. The tool is limited in usefulness because the V-notch is the only method of weed removal. It is not suitable for slicing or chopping the weeds. This implement can only remove a few weeds at a time, which renders it less productive.

U.S. Pat. No. 3,841,414, issued to William L. Perkins on Oct. 15, 1974, shows a garden tool having a flattened shaft that extends straight out from the handle. The lower end of the shaft is bent at a right angle, making it perpendicular to the shaft. This elongated projection is sharpened at the very tip and on one edge. This tool is designed as a weeder and removes weeds by having the user make two specific actions. First, the tip of the tool is "driven" into the ground close to the weed, using a chopping action. The tool is then rotated clockwise so that the one sharpened edge of the bent shaft cuts the roots of the weed below the ground. The user then pulls up the weed, thus removing the surface growth of the weed. When a tool has a single point, or tip, it has a tendency to glance when hitting a fibrous stalk or a rock. The tool may have to be removed and driven back into the ground. This would require extra effort on the part of the operator. This tool is useful for removing a few weeds at a time in a small area. This makes weeding less productive and more tedious.

U.S. Pat. No. 4,177,864, issued to Edlo Donnini on Dec. 11, 1979, depicts a gardening tool having a long handle, to which a rectangular rod is attached. The rod extends from the handle and is formed in a semi-circular rod portion. The working end of the rod is wider than the rest of the rod and is notched and sharpened at the very tip. The working end of the implement is used to extract weeds and create furrows when it is pulled thru the soil. The shape of the rod and the working end are similar to a cobra that is ready to strike. The usefulness of this tool is limited because of the relatively narrow width of the flat planar surface of the tip. Because this working area is in line with the handle, the tool is primarily only useful in a pulling action.

"Johnny's Selected Seeds" catalog 2009, page 188, item (A) 9374, shows a long-handled, wire formed garden tool. The working portion is comprised of a 5/16 inch diameter round rod or wire shaft that is bent, curved, and has its base formed into a flattened blade. The end of the blade is rounded and blunt. As stated in the description, " . . . this tool allows a standing worker to remove small weeds . . . " The blunt end lessens the control that the operator has in the tool. The tip will tend to glance when driven, or skate when pushed or pulled to score hard soil. The long wire formed shaft between the handle socket and blade flexes when tough weeds or compacted soil is encountered. This flexing of the shaft requires more effort by the operator which in turn causes operator fatigue. This tool has a thick blade, relative to its width, which displaces more soil that may have to be redistributed. Hilling around plants is more challenging due to the narrowness of the blade. When encountering rocks or hard, compacted soil, the smaller diameter handle also flexes which absorbs the force that should be transferred to the tool's blade.

Therefore, there remains a need for a gardening tool that can more easily capture and remove weeds, and requires minimum effort by the user, and has multipurpose use.

SUMMARY OF THE INVENTION

It is therefore, an object of the present invention to provide a gardening and landscaping tool that is easy to use, accomplishes a variety of tasks, and completes these tasks with a minimum amount of effort on the part of the operator.

It is a further object of the invention to provide a tool that is easily manipulated in tight spaces, removing the weeds while not harming the desired plants.

Another object of the invention is to provide a hand tool that performs multiple functions so that the user does not have to purchase or transport several tools.

An additional object of the invention is to provide an implement that is compact and sound in design, as well as being efficient and versatile in use.

It is a further object of the invention to provide a gardening and landscaping tool with handles of different lengths that may therefore be attached at different angles. This would create an appropriate tool for use when standing, sitting or kneeling.

Other objects and advantages of the invention will become apparent from the following description taken in conjunction with the accompanying drawings.

It is with the above objects in mind that the present invention was created. A flat sheet of stainless steel is laser cut, forming a blade blank. The blade blank has the desired radius, cutout, tapers, and notch in the tip. The two longitudinal sides and the tip are ground into cutting edges, which completes the blade in its flat form. The blade is then bent into the shape of the letter "J" which is laid on its longer side. This completes the formation of the blade as it is used in the garden tool. The tang is then welded on, which creates the tool head. The tool head is heat treated, first by hardening and then tempering, to achieve a tool head which is tough and resilient. The tool head is then attached to a handle by means of the tang. The unique design creates a garden tool that easily performs multiple functions. The component parts produce a tool that is durable and strong. The special features of the implement increase the speed and the ease of work of the user. The unique design of the compact tool head gives the operator the versatility and agility needed when working around plants.

The resulting tool contains an elongated handle attached to a tool head on one end of the handle. The tool head contains a flat blade that is bent in a "J" shape. The short leg of the "J," referred to herein as a flange, is attached to the handle, preferably via a tang. The long leg of the "J," referred to herein as a horizontal base, is the main "working end" of the tool. The curved portion of the "J" forms a heel which is at least 50% beveled. The top edges of the horizontal base are beveled, preferably a downward bevel such that the bevel on the horizontal base is away from the handle or toward the periphery of the "J." The tip of the horizontal base is also beveled and preferably contains a notch. The notch has tapered sides like a "V", but has a rounded bottom like a "U". The tapered sides allow dirt and debris, captured when weeding, to be more easily released so that clogging of the opening is reduced. The rounded bottom allows weeds to be captured and isolated for removal with less chance of cutting them. This combination of a "V" and a "U" opening will be referred to as a "U" notch throughout this document.

BRIEF DESCRIPTION OF DRAWINGS

It is to be noted, that the appended drawings illustrate only a typical embodiment of this invention and are therefore not to be considered limiting of its scope. In the following drawings.

DETAILED DESCRIPTION OF THE PREFERRED EMBODIMENTS

Throughout the drawings, like reference numerals refer to like elements. The reference numerals are as follows: Garden Tool 20, Handle 22, Ferrule 24, Hole 25, Rivet 26, Tool Head 28, Tang 30, Blade 34, Cutout 36, Tip 38, Horizontal Base 40, Bottom Curvature 42, Top Curvature 44, Heel 46, Flange 48, Beveled Edges 50, and "U" Notch 52.

The present embodiment may be used for weeding, edging, cultivating, making and covering furrows, tamping, hoeing, hilling, chopping, contouring, and slicing. The following is a description of certain embodiments of the invention. Other embodiments may be made without departing from the spirit or scope of the invention. For clarity, these various embodiments are discussed in a separate section that follows this description of the drawings.

Figure 1:
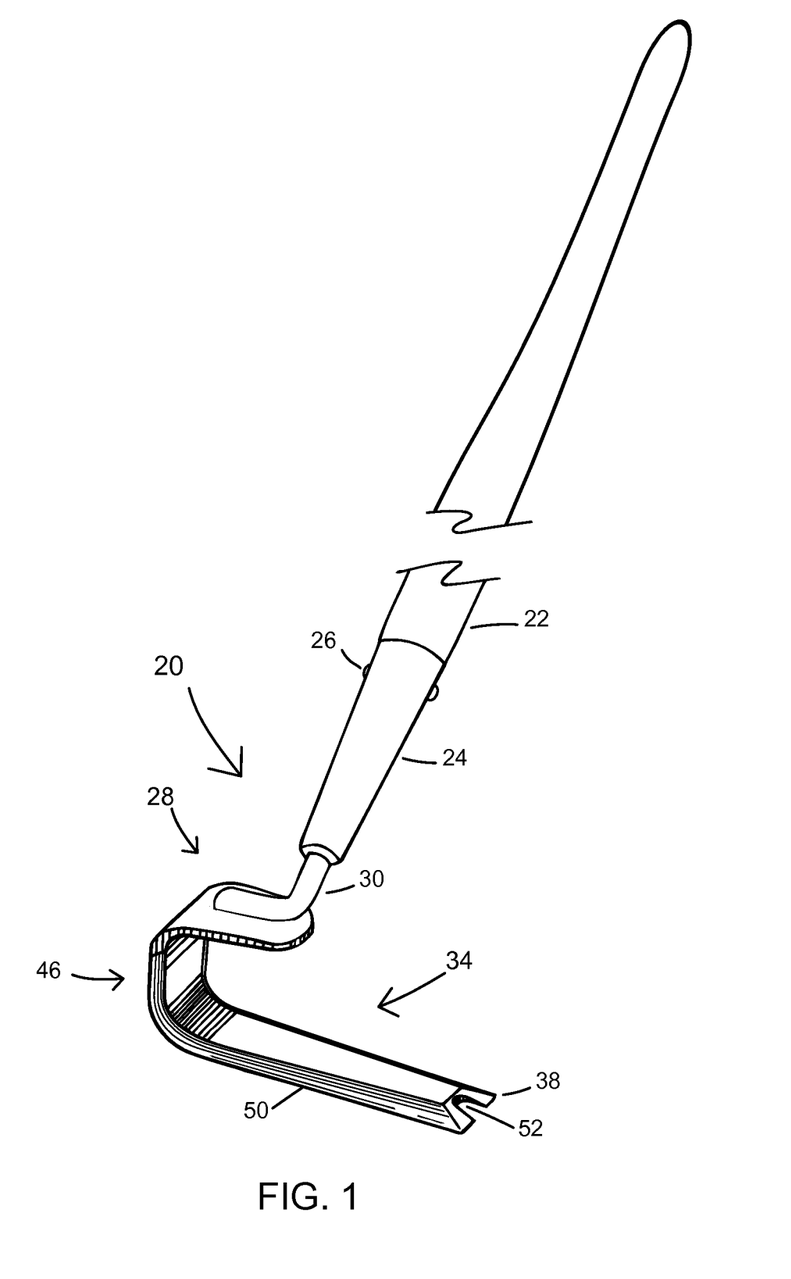
FIG. 1 is a perspective view of a garden tool embodying my invention. The handle portion of the device being partly broken away.

Referring to FIG. 1 of the drawings, there is shown the present embodiment of a garden tool, indicated generally by the reference numeral 20. Garden tool 20 is composed of an elongated cylindrical, wooden handle 22 and a tool head 28. The handle 22 is preferably formed of wood. However, other materials such as plastics, metals, fiberglass, composites, etc. are also appropriate. Other embodiments may have handle 22 vary in length, from 2 inches in length to 86 inches in length. These variations in length may permit the operator to stand, sit or kneel when using the tool. It is to be understood that these various lengths would not depart from the spirit or scope of the invention.

Figure 2:
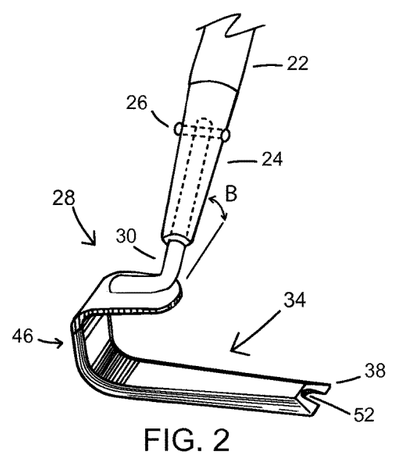
FIG. 2 is a perspective view of the garden tool of FIG. 1. Showing in phantom line; the tang that is embedded into the wood handle, and the rivet that further secures the tang in the handle.

Referring particularly to FIG. 2, the tool head 28 is preferably secured to the handle 22 by a tang 30. An opening in the lower end of the handle 22 has been formed, allowing for the insertion of the tang 30 of the tool head 28, as illustrated in phantom line. To securely attach the tool head 28; epoxy, or any appropriate gluing agent, is applied to the tang 30 or the opening in the handle 22 before insertion of the tang 30 and the subsequent installation of the rivet 26. The rivet 26, as illustrated in phantom line, passes thru the ferrule 24, the tang 30, and the handle 22. The ferrule 24 as well as being a decorative item, prevents the wood surrounding the tang 30 from splitting open which might let the tang 30 become loose. In addition, the tool head 28 is preferably made of a metal so that the tool head 28 is rigid and able to withstand use.

Figure 3:
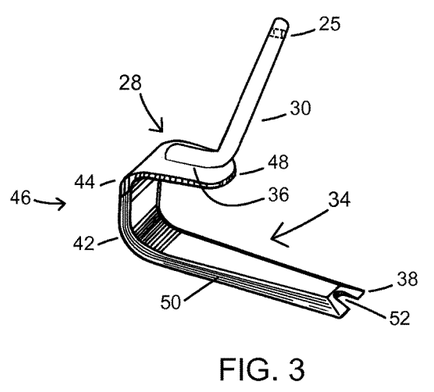
FIG. 3 is a perspective view of the tool head of the garden tool shown in FIG. 1. Showing in phantom line the hole in the tang for inserting the rivet that secures the tool head to the handle of the garden tool shown in FIG. 1.

Attention is now directed to tool head 28, as shown in FIG. 3. It comprises a blade 34 and optionally, a tang 30. The tang 30 is preferably formed from a cylindrical stainless steel rod which is bent at an angle. When the garden tool 20 is formed with a long handle 22 for use in a standing position, or a medium length handle 22 for use in a kneeling position, the tang 30 preferably is formed at an angle of approximately 90 degrees, creating an "L" shape having a shorter leg at a right angle to a longer leg, as shown in FIGS. 1-18. Accordingly, the longitudinal axis of the handle 22 is positioned at a right angle to the longitudinal axis of the horizontal base 40 of the blade 34, as best shown by angle A in FIG. 6. On the other hand, when the tool is formed with a short handle 22 for use in a kneeling position, the tang 30 is preferably formed so that the legs are at an angle of approximately 120 degrees with respect to one another. This, in turn, positions the horizontal base 40 of the blade 34 to be 120 degrees with respect to the handle 22. In that embodiment, the angle is formed so that the tip 38 points back toward the handle 22, so that the user can pull the blade 34 into the ground.

When garden tool 20 is made for a long handle 22, the lower, shorter leg of the tang 30 is welded to the blade 34 at an angle of approximately 40 degrees inclined upwardly with respect to the horizontal flange 48. The upper, longer leg contains a circular hole 25 which is perpendicular to the longitudinal axis of that longer length of the tang 30. The rivet 26 is installed into the hole 25 to attach the tool head 28 to the handle 22. When this attachment is made, the longitudinal axis of the upper length of the tang 30 and the handle 22 are generally aligned.

Figures 4, 5, 6:
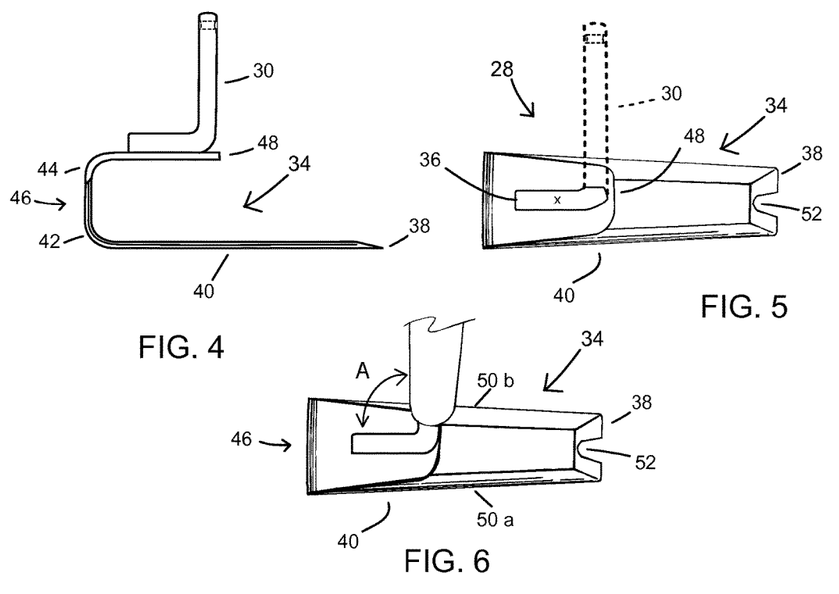
FIG. 4 is a front elevation view of the tool head of the garden tool shown in FIG. 1.
FIG. 5 is a top plan view of the blade of the garden tool shown in FIG. 1, showing the cutout that is provided for the tang. Shown in phantom line, is the position of the upper end portion of the tang when it is placed in the cutout, as referenced by an "X"
FIG. 6 is a top plan view of the garden tool shown in FIG. 1.

Referring again to FIGS. 3 and 4, the blade 34 is shown. The unique design of the blade 34 enables the user to perform a variety of functions. As best shown in FIG. 4, the blade 34 is a flat, J-shaped piece of metal. The horizontal base 40 forms the long leg of the J, and the flange 48 forms the short leg of the J. The transition area between the horizontal base 40 and the flange 48 contains a bottom curvature 42 and a top curvature 44. These two curvatures, form the closed-end, or heel 46 of the blade 34. A notch, and preferably a generally U-shaped notch 52, is formed in the tip 38 of the horizontal base 40.

The blade 34 enables the garden tool 20 to be used for many actions such as slicing and chopping. The blade 34 is made from a sheet of stainless steel that starts out with an approximate thickness of about 0.140 inches. The bottom surface of the horizontal base 40, which is flat, faces the soil, and the top surface of the blade 34, which has the beveled edges 50, faces the operator. The two longitudinal edges of the top surface of the blade 34 are preferably downwardly beveled (beveled away from the center or toward the peripheries of the "J") to form the beveled edges 50. This downward beveling reduces the thickness of the blade 34 to an approximate beveled blade edge thickness of about 0.014 to 0.020 inches. This makes the edges thinner than the center portion of the blade 34. Although, in another embodiment of the garden tool 20, the beveled edges 50 could be beveled to a sharp edge with a lesser, or a "near" zero, edge thickness, this thinner edge would be more prone to damage during use. The beveled edges 50 reduce the operator's effort when moving the garden tool 20 thru the soil, as when using a slicing action during cultivating.

The horizontal base 40 is flat on the bottom and is provided with a downward bevel on the top. The top downward bevel on the horizontal base 40 reduces resistance which allows the blade 34 to more easily enter and stay below the surface of the soil. An upward bevel on the bottom of the horizontal base 40 would require more effort on the part of the user to get and keep the horizontal base 40 below the soil. The flat bottom of the horizontal base 40 reduces the effort of the operator in wet or muddy ground as less dirt will stick, causing less resistance, to a flat surface because of a shearing action between the blade 34 and the soil. A horizontal base 40 that was formed with a concave shape, would tend to allow mud or wet soil to stick in the concave area and create more resistance to the operator.

As shown in FIGS. 1-18, the tip 38 is also downwardly beveled to have an edge thickness of approximately 0.031 inches. Its beveled edge is preferably thicker than the longitudinal edges because it is going to see higher impact forces when chopping and more wear due to it being used to score and cultivate the soil. As shown more specifically in FIG. 3, the tip 38 is provided with a center "U" notch 52. The inner walls of the "U" notch 52 are perpendicular to the horizontal base 40 of the blade 34. The tip 38 is used to chop weeds or score the soil. Chopping is achieved by an up and down vertical action. The garden tool 20 is raised above the ground with the tip 38 pointing down. The operator makes the chopping motion, driving the tip 38 into the soil, mulch, weeds or debris. Scoring is achieved by placing the tip 38 down into the soil and pushing or pulling the garden tool 20 to loosen compacted soil or to make a furrow.

After the blade 34 has been beveled, the bends or curvatures are formed. Tooling is made that has the desired radius for the bottom curvature 42 and the top curvature 44. These two curvatures 42 and 44 have an approximately 90 degree bend with a 0.750 inch radius. The flat metal blade blank is bent around a form with the desired radius to make the bends and form the bottom curvature 42 and the top curvature 44 of the blade 34. The use of a radius in the bends makes the blade 34 stronger. A blade with zero radius corners or very tight bends is more easily deformed as stresses from use are concentrated in a smaller area.

This unique shape of the garden tool 20 is particularly shown in FIG. 4 of the drawings. After bending, the flat blade blank takes on the shape of the letter "J" which has been laid on its longer side. The longer side or horizontal base 40 provides the main cultivating portion of the garden tool 20. The two curvatures create the closed-end, or the heel 46 of the blade 34. The heel 46 also provides an additional means for cultivating because the beveling from the horizontal base 40 continues on the heel 46. The remaining length or the flange 48 is approximately parallel to the horizontal base 40. It is on the flange 48 that the tang 30 is welded.

Referring back to FIG. 3, the details of the beveling of the garden tool 20 will be further discussed. Because of the location of the bending and the resulting formation of the curvatures, the beveling of the edges preferably continues up the bottom curvature 42 and at least halfway to where the top curvature 44 begins. The beveling on the bottom curvature 42 allows for easier soil cultivation as well as gouging or scooping when the garden tool 20 is turned on its closed-end, the heel 46. The beveling preferably stops before the top curvature 44 ends, so that the flange 48 is preferably not beveled. The flange 48 provides an area for the firm holding of the cylindrical tang 30, when it is laid in the cutout 36 and welded in place.

As shown in FIG. 5, the width of the flange 48 is forwardly tapered. Shown in phantom line, the tang 30 is laid in the cutout 36 and is securely welded in place. Attaching the tang 30 to the blade 34 creates the working portion, or tool head 28 of the invention. The cutout 36 is a section of the flange 48 that has been removed, to allow for positioning and alignment of the tang 30 for welding. The tang 30 lies within the cutout 36, so that the bottom edge of the tang 30 lies below the top surface of the flange 48. The tang 30 can be welded from the bottom of the flange 48, or the top of the flange 48, or both the top and bottom of the flange 48. In addition, the tang 30 can be welded at any angle B (see FIG. 2) with respect to the flange 48 by pivoting the handle 22 about the short leg of the tang 30. When the handle 22 has a medium or a long length, the handle 22 can be at about 30-60 degrees, and preferably 40 degrees, to horizontal. When the handle 22 is short, the handle 22 is preferably at an angle B of about 12-15 degrees above horizontal.

As shown in FIG. 6, the width of the flange 48 and the width of the horizontal base 40 taper toward the tip 38 of the blade 34. The blade 34 has its two longitudinal edges downwardly beveled, creating beveled cutting edges 50a and 50b. These beveled edges 50a and 50b, combined with the tapering of the blade 34, reduce the effort required to move the blade 34 through the soil.

The tip 38 of the blade 34 is downwardly beveled and is provided with a center "U" notch 52. The "U" notch 52. is located within the area of the downward beveling of the tip 38. The formation of the "U" notch 52 in the tip 38 provides two points. These points give the operator better control of the garden tool 20, as it lessens glancing when the tip 38 is used in a stabbing or chopping action. The two points also reduce skating when the tip 38 is used to score compacted soil. Two points give the operator more control when the operator is scoring a path thru compacted soil, as each point is less influenced, than a single point would be, to any obstruction that is encountered.

The inner walls of "U" notch 52 are perpendicular to the horizontal base 40 of the blade 34. The legs of the "U" notch 52 are not parallel to each other, but rather tapered from the end of tip 38 to the curvature of the "U" notch 52. The "U" notch 52 allows for capturing and holding weeds, rather than cutting off their tops. The weed can be captured in the "U" notch 52 and then removed by pushing or pulling the handle 22 of the garden tool 20. Taking out the entire weed is preferable, rather than leaving the root which may allow the weed to grow back.

The blade 34 of the garden tool 20, preferably has an approximate length of about 6 to 6¼ inches. This dimension is from the leading edge of the tip 38 to the outside edge of the heel 46. Useful hand tools could be made with a blade length of 2 to 9 inches. The tip 38 of the blade 34 preferably has a width of 1.438 inches. The widest point of the blade 34 is preferably about 2 inches. Useful hand tools could be made with the blade 34 having a width of ⅜ inches to 3 inches. The blade 34 preferably tapers from its widest point in both directions. The front, open end portion of the blade 34 preferably tapers to an approximate width of 1.438 inches at the tip 38. The rear end preferably tapers to an approximate width of 1.38 inches, which is the starting point of the 0.750 inch radius. As a result of the bending process, this rear end portion becomes the flange 48 which has an end radius of about 0.750 inches. The height of the blade 34 (from the bottom of the horizontal base 40 up to the top of the flange 48) is preferably 2¾ inches to 3 inches. Useful hand tools could be made with the height of the blade 34 increased or decreased. The thickness of blade 34 is approximately 0.140 inches at the thickest point, to approximately 0.014 to 0.020 inches at the downwardly beveled edges, and to approximately 0.020 to 0.031 inches at the tip. A multifunctional implement is found in the relatively small space that makes up the blade 34 of the garden tool 20.

The dimensions and versatility of the garden tool 20 allow for working closely and carefully around established plants and landscape items. The operator may rotate the tool head 28 to use either the tip 38 or the heel 46 sections of the garden tool 20, as well as the elongated sides of the horizontal base 40. The garden tool 20 may be used with the horizontal base 40 parallel to the ground or at any angle from the ground, up to 90 degrees.

The characteristics of the garden tool 20, the notched beveled tip 38, the tapered, beveled edges 50a and 50b, and the tapered, beveled heel 46, provide the operator with a single tool that chops, cultivates, hoes, slices, edges, rakes, and hills plants. The garden tool 20 works well in both gardens and landscapes and may be used to assist in planting. The unique design creates a durable tool that can be used with less effort being put forth by the operator. The operator can adjust the effort needed to move the blade 34 thru the soil by changing the angle of the blade 34.

Soil that is compacted can first be loosened by putting the blade 34 nearly vertical and scoring the earth by pulling the tip 38 toward the operator. This scoring motion loosens the soil and helps dislodge embedded rocks. The preliminary scoring of the earth makes cultivating much easier because the full width of the blade 34 does not have to be forced thru the soil. As a result, the garden tool 20 is less prone to being stopped suddenly by rocks, hard soil or vegetation, which otherwise tires the user and requires multiple operations by the user to force the blade 34 through the soil and embedded rocks. The amount of effort needed for each tool movement can be varied by adjusting the angle of the blade 34.

After scoring the soil, the angle of the blade 34 is lowered so more of the beveled edges 50a and 50b are in contact with the earth. A shuffling, push and pull motion may now be used to continue cultivation. Any smaller rocks that are loose may be removed by sliding the blade 34 under them and tossing or flicking them aside. Another method of removal is to turn the tool head 28 over and then raking, pushing or pulling them aside.

While the above description contains many details, these should not be taken as limitations on the scope of the invention, but rather as an example of the preferred embodiments. Changes in the construction and in the arrangement of the various cooperating parts may be made without departing from the spirit or scope of the invention. The following are examples of some of the modifications and changes that may be made to the present embodiment without departing from the spirit or scope of the invention.

1. Handle:

Other embodiments of the invention can have the handle 22 formed of plastic, metal, fiberglass or some composite material. Another embodiment can have the handle 22 made with a cushioned grip. The handle 22 can also be of a length, from two to eighty-six inches. Other embodiments of the invention can have both the opening of the handle 22 and the upper end of the tang 30 threaded prior to insertion of the tang 30 into the handle 22. Other embodiments of the invention can have the handle 22 be not entirely cylindrical, but rather "shaped", as in an hour-glass, oval, rectangular or some other shape. Other embodiments can have any combination of the aforementioned features without departing from the spirit or scope of the invention.

2. Ferrule:

Other embodiments of the invention can have the ferrule 24 be of a length from one-fourth inch to twelve inches. Other embodiments can have the ferrule 24 attached to the handle 22 by swaging, by means of a nut and bolt assembly, by nails, by screws or by crimping of the ferrule 24 to the handle 22, or by the application of epoxy, or some other adhesive agent. Other embodiments of the invention can have the ferrule 24 replaced with a socket which would be the attachment point for the tang 30. Another embodiment can have a flange portion, extending from a ferrule, or a socket, that would be attached to the handle 22. This flange would then be the attachment point of the tool head. Other embodiments can have any combination of the aforementioned features without departing from the spirit or scope of the invention.

3. Tang:

Another embodiment can have the tang 30 rotated, so as to be positioned over the opposite edge of the flange 48. This positioning would result in an implement better suited for left-handed use. Other embodiments of the invention can have the tang 30 created from a metal rod, composites rod, or plastic rod, or from a metal tube. Other embodiments can have the tang 30 be of some other shape rather than cylindrical, such as hexagonal, square or rectangular. Other embodiments can have the tang 30 threaded on the upper end portion prior to insertion into the handle 22. Other embodiments can have the tang 30 created by forging or die casting. Another embodiment could have the tang 30 crimped, swaged, knurled or friction fitted to secure it in the handle 22. Another embodiment can have the tang 30 secured to the handle 22 by a rivet, a screw, a nail or a peg. Another embodiment can have the tang 30 secured to the handle 22 by rivets, screws, nails, pegs, or any combination thereof. Another embodiment can have the tang 30 attached to a socket or ferrule on the end of the handle 22. Other embodiments of the invention can have the tang 30 flattened on the lower end portion and provided with a hole or holes. The flange 48 would therefore also be provided with a corresponding hole or holes for the attachment of the tang 30 by means of nut and bolt assemblies, or rivets. Other embodiments can have the tang 30 attached by welding, brazing or bonding with adhesives or gluing agents. If the tang 30 were formed from plastic, attachment to the blade 34 could be bonding by ultrasonic vibration. Another embodiment may eliminate the tang 30 altogether, as a separate entity, and attach the blade 34 directly to the handle 22 or the ferrule 24. Other embodiments can have any combination of the aforementioned features without departing from the spirit or scope of the invention.

4. Blade—Manufacture:

Other embodiments of the invention can have the blade 34 formed from metal, composites or plastic; by means of cutting, shearing, laser cutting, stamping, die casting, metal injection molding, or forging. Other embodiments of the invention can have changes in the length, width or the thickness, or any combination thereof, of the blade 34. Other embodiments can have the blade 34 forwardly tapered at various angles, or formed with no tapering at all. Other embodiments can have wholly or partially serrated beveled edges; scalloped edges; corrugated edges; or edges formed in a strictly rectangular manner, that is, no tapering, beveling, shaping or sharpening. Other embodiment of the invention can have changes in the width of the tip 38. Other embodiments can have a blunt tip on the open end, that is, no beveling on the tip 38. Other embodiments can have changes in the size of the "U" notch 52. Other embodiments of the invention can have the "U" notch 52 formed in a different manner, such as a "V" notch, which may be beveled, a scalloped notch or a serrated notch. Another embodiment can have a hole or holes in the flange 48. The alignment of this hole, or holes, and the corresponding hole, or holes, in the tang 30 would allow nut and bolt assemblies, or rivets to be used for connecting the tang 30 to the blade 34. Other embodiments of the invention can have the tang 30 welded or brazed directly to the flange 48. That is, there would be no holes or cutouts at all. Other embodiments can have any combination of the aforementioned features without departing from the spirit or scope of the invention.

5. Blade—Shape:

Another embodiment of the invention can have the blade 34 beveled and bent in the opposite manner, relating to the cutout 36 for the tang 30. This would result in an implement better suited for left-handed use. Other embodiments can have the horizontal base 40 shaped in a concave or a convex form. Other embodiments of the invention can have changes in the degree of radius of the bottom curvature 42 or the top curvature 44 or both curvatures. Another embodiment of the invention can have the vertical height of the heel 46 be of different various heights. That is, the vertical distance from the bottom of the horizontal base 40 to the top of the flange 48 could be increased or decreased. Another embodiment can have the flange 48 angled in an upward direction over the horizontal base 40. Thus, the flange 48 would not be parallel to the horizontal base 40.

Another embodiment of the invention can have the flange 48 extended and formed in an upward manner. The uppermost end would then be formed in to a tubular, rectangular, cylindrical, hexagonal or some other shape that would become the protrusion, shaft or tang 30 which would be inserted into the opening of the handle 22. In that way, tool head 28 and the tang 30 would be created from one single piece of material. The tang 30 would therefore become an extension, or continuation of the blade 34. Other embodiments of the invention can have a tool head 28 without a top curvature 44, or without a flange 48, or having neither a top curvature 44 nor a flange 48. Instead, the tang 30 would continue down from the handle 22 and replace either or both of these elements. Therefore, the tang 30 would be directly attached to the top curvature 44 or, in the other instance, the vertical section of the heel 46. Other embodiments can have any combination of the aforementioned features without departing from the spirit, or scope of the invention.

The advantages of the garden tool 20 will be more readily apparent from the following discussion of the manner of use, when taken in conjunction with FIGS. 7-18 of the accompanying drawings. The garden tool 20 is easily handled and controlled. At the same time, the manufacture and formation of the component parts create a tool that is rigid and tough.

The present embodiment of the implement is designed so that the tool head 28 has a small foot print, while still being constructed for strength and durability. The illustrated embodiment of the invention has a long handle 22, which implies that more aggressive actions could be taken by the operator. The operator, being in a standing position, with a longer handle 22 is able to work a larger area of ground. The blade 34 of the garden tool 20 of the present embodiment most preferably has the following dimensions:

Length 6 to 6¼ inches (from the tip to the outside edge of the heel)

Width 2 inches at its widest point 1.438 inches wide at the tip 1.38 inches wide at the flange, where the 0.750 inch radius begins Height Blade height of 2½ inches to 3 inches Blade Thickness 0.140 inches at the thickest area 0.014 to 0.020 inches at the downwardly beveled edges 0.020 to 0.031 inches at the tip Bevel Width 0.375 to 0.625 inches at the longitudinal edges 0.500 inches to 0.750 inches at the tip It should be understood that these dimensions are the preferred dimensions of the illustrated embodiment. However, it should be appreciated that other sizes and dimensions of the garden tool 20 can be utilized without departing from the spirit and scope of the invention. Some changes in the present embodiment could be made without affecting the ease of use, durability, versatility, and ruggedness of the garden tool 20.

The manufacturing process of the stainless steel blade 34 creates a rigid blade 34 that reduces the energy lost thru flexing. Garden tool 20 more easily slices thru weeds instead of being stopped by them. If tool head 28 were relatively light, it might flex more and the effectiveness of the garden tool 20 must be achieved by the extra exertion of the user. When the operator has to put forth more effort, fatigue sets in and gardening becomes a chore. The user may be more deliberate in performing various functions while expending less effort because tool head 28 is rigid and has sufficient weight. This weight distribution actually allows garden tool 20 to aid in performing the required tasks, as it has less tendency to skate across the surface of the soil. Therefore, it requires less effort by the operator to position the blade 34 below the surface of the soil.

An important feature of the connection of the tool head 28 and the handle 22 is that handle 22 is attached over, or above, the blade 34. The positioning of the blade 34 in the soil is more instinctively controlled by the operator. The operator is able to see the location of the heel 46 and is able to cultivate and weed more accurately, speedily, and closely around plants without any appreciable danger of injury to the plants. When the blade 34 is angled so that the tip 38 is in the soil, with some portion of the blade 34 being out of the soil, the operator is aware of the relative position of the tip 38.

The garden tool 20 is quite versatile and its specific functions will be more readily understood when taken in conjunction with the referenced drawings of FIG. 7 thru FIG. 18. It should be noted that FIGS. 7-18 depict a long handled embodiment of the invention. A short handled embodiment is generally just as capable of performing the depicted functions. The long handled embodiment of the garden tool 20 would generally be used when the operator is standing and would therefore perform tasks over a larger area. For those who desire to perform tasks in a smaller area and desire to be closer to the ground, an embodiment having handle 22 be of a short or a medium length might be preferable. An embodiment of the garden tool 20 could be of a short length, up to a foot in length. An embodiment of the garden tool 20 could be of a medium length, from 1 to 2 feet in length. An embodiment of the current invention where the garden tool 20 is of a medium length would facilitate use by an operator who is kneeling or sitting and who requires a longer reach. When the garden tool 20 is formed with a handle 22 of either a short length or a medium length, the angle of attachment of the handle 22 is adjusted so as to facilitate the ease of use of the operator who is kneeling or sitting.

Figure 7:
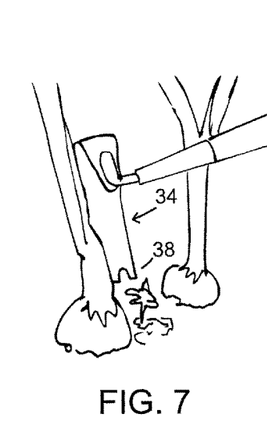
FIGS. 7 to 18 are perspective diagrams illustrating various operative positions of the garden tool in FIG. 1.

Turning first to FIG. 7, one of the key features of the present invention is the versatility of the tip 38. By placing the tapered blade 34 in a vertical position and using a chopping action, the tip 38 acts to sever the weeds or loosen the soil around the weeds so they can be dislodged for removal. The beveled edges 50 along with the beveling on the tip 38 facilitate soil penetration when garden tool 20 is used in a chopping motion. The "U" notch 52 displaces soil around the weed root which can then be severed or captured in "U" notch 52 and pushed or pulled out.

Figure 8:
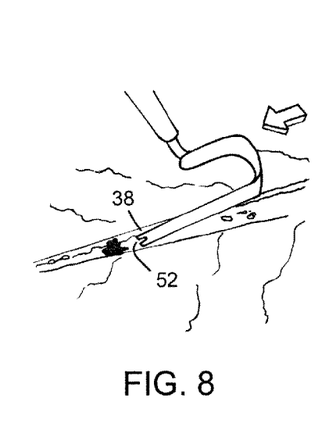

FIG. 8 shows that the tip 38 and "U" notch 52 can be manipulated for precision weed removal in tight places, such as between patio stones. The beveling on the tip 38 facilitates penetrating the soil. The "U" notch 52 captures the weeds. The blade 34 is relatively thin, but still rigid and strong, which allows the tip 38 to slice through tight, confined spaces.

Figure 9:
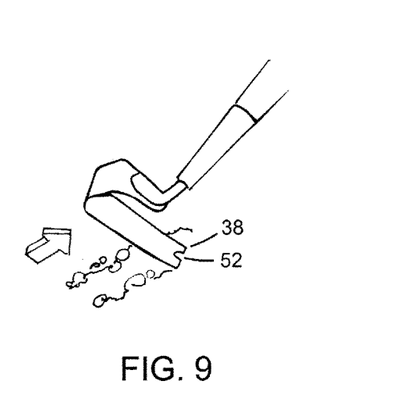

FIG. 9 shows that the "U" notch 52 lessens glancing and skating when working the soil, by providing two smaller pressure points. These points act like two miniature plow blades. The beveled tip 38 can be used to score through hard dirt to begin loosening the soil for planting or cultivating. Once the soil is loosened, the blade 34 can be angled like a plow blade and used to create a furrow for planting seeds.

Figure 10:
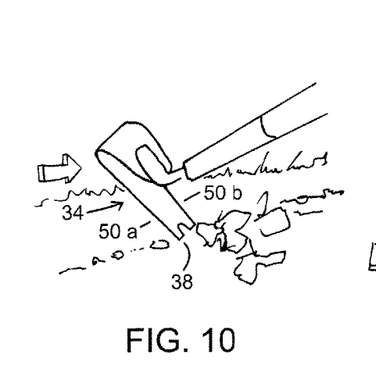

FIG. 10 shows that edging is another task made easier by using the beveled tip 38 along with the beveled edges 50*a* and 50*b*. The tip 38 is put in the ground. The beveling on the tip 38 as well as the tapering of the blade 34 makes it easier to penetrate the soil. The blade 34 is then angled vertically and used in a slicing action for edging. The beveled edges 50*a* and 50*b* aid in the edging of an area such as a flower garden. To help remove a stubborn weed, the tip 38 may be used in a chopping motion. Or, the user can apply foot pressure to the heel 46 of the garden tool 20.

Figure 11:
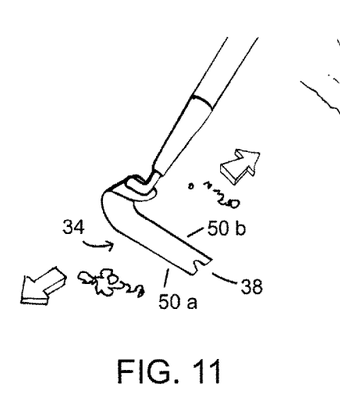

FIG. 11 shows that the gardening tool 20, when used in a forward and backward, shuffling motion, the beveled tip 38, along with the beveled edges 50*a* and 50*b* facilitate surface cultivation of the soil. The blade 34 is relatively thin, but still rigid and strong. The tapering of the blade 34 along with the beveled edges 50*a* and 50*b* displace less soil. The operator does not have to go strictly forward and backward, but may also go in an arcing motion. The blade 34 may be angled to adjust how much of the blade 34 is in contact with the soil. Therefore, less effort is needed when making a shuffling, slicing or scything motion.

Figure 12:
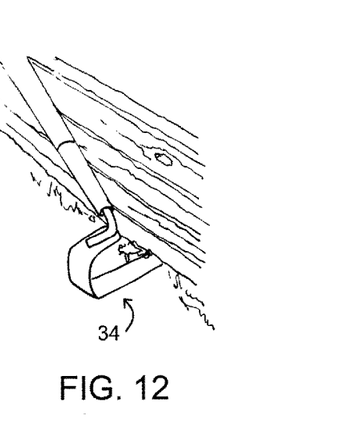

FIG. 12 shows that the open end, narrow foot print, and forward tapering of the blade 34 facilitates more positions in which the garden tool 20 may be used by the operator. The open end of the blade 34 extends beyond the longitudinal axis of the handle 22. The open end of the blade 34 may be placed under broad-leaf plants, as well as under landscaping items, such as birdbaths or logs, to use a forward or rearward slicing motion for weed removal.

Figure 13:
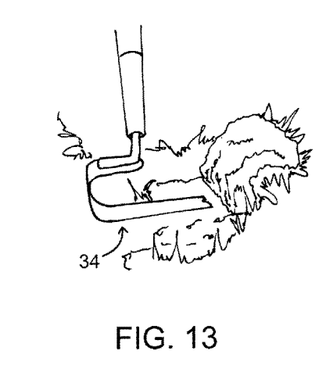

FIG. 13 shows that the open end of the blade 34 can also be used in a horizontal slicing, prying motion to remove sod, such as when the operator wants to enlarge a flower bed. The thin open end of the blade 34 goes under the sod to slice the roots. The operator then uses a prying motion to lift the sod, and the user's foot can be used against the flat outer part of the heel 46 to apply a forward motion, if necessary. These actions are continued to roll the sod for removal.

Figure 14:
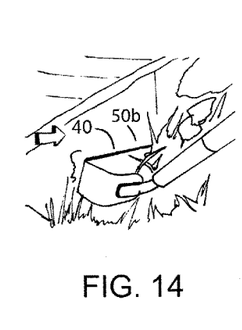

FIG. 14 shows that the horizontal base 40 of the blade 34 is practical when using the beveled edges 50*a* and 50*b* to edge along steps, walls or fences. Turning the horizontal base 40 on its edge, the operator can get close to steps and vertical surfaces. Then the beveled edges 50*a* and 50*b* can be used in a slicing or chopping motion to remove weeds along the vertical steps, walls or fences.

Figure 15:
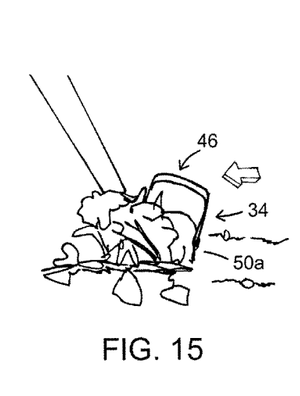

FIG. 15 shows that the blade 34 is of sufficient strength so that when it is turned on its edge, the beveled edge 50*a* and the heel 46 can be used in a chopping manner to break up weeds, dirt, mulch or debris. When first weeding in the spring, the weeds from the previous year might be long and unwieldy. The heel 46 and the beveled edge 50*a* can be used to chop them into a smaller, more manageable size for easier removal. After chopping, the blade 34 can be used in a raking manner to gather the weeds, dirt, mulch or debris.

Figure 16:
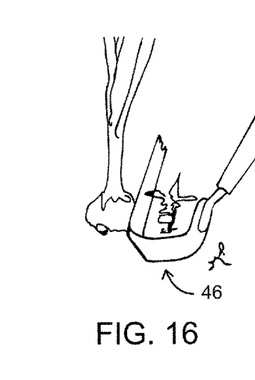

FIG. 16 shows that the heel 46 is of sufficient rigidity and width to facilitate a variety of tasks. The beveling on both edges of the heel 46 allows for scooping or gouging out of larger weeds. After weeding a flower bed or landscape area, the heel 46 facilitates the smoothing out of any displaced dirt or mulch. When placing a flat stone in the landscape, or flower garden, the heel 46 can be used to prepare the area for the stone. Soil can be scooped out, as well as leveled and tamped, using the heel 46. After laying the stone, the outer edge of the heel 46 or the bottom of the blade 34 can be used to push soil around the stone for a firm placement.

Figure 17:
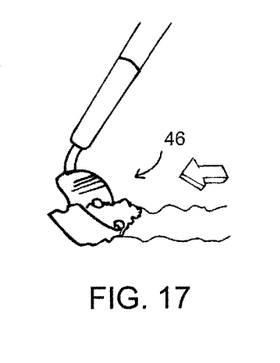

FIG. 17 shows that the strength of the heel 46 is such that it can be used to break up the soil, or to dig a wider furrow for planting. It is also useful when driven quickly down in a chopping motion for edging. The heel 46 may be used to create a groove, or outline around the edge of a flower bed, or landscape area. It may be used to create a furrow for planting seeds and then to tamp the soil when covering the seeds. The heel 46 may be used for scooping out dirt for the placement of small plants.

Figure 18:
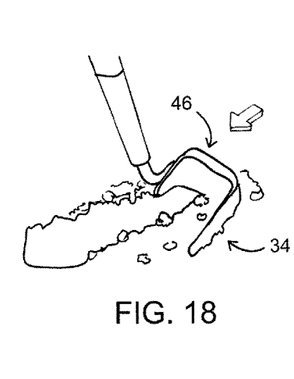

FIG. 18 shows that the heel 46 can used in combination with the blade 34 in a raking or hoeing motion to gather soil for hilling around already established plants. It can be used in a raking motion to gather small rocks. Once seeds are sown in a furrow, the bottom of the horizontal base 40, as well as the heel 46 can be used to tamp the soil over the seeds.

As referenced in the previous statements about the present embodiment, the operator of the garden tool 20 can perform many functions because of its unique design and toughness. Garden tool 20, being of such manufacture and component parts, is compact while still being durable in nature.

It should further be noted that the tool head 28 is shown and described as part of a manual garden tool 20 that has a handle 22. However, the tool head 28 can be used in a power tool having one or more tool heads 28.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A garden tool comprising:
a handle having a longitudinal axis; and
a tool head comprising a single piece flat blade that is bent in a substantially "J" shape, said flat blade having:
a substantially elongated horizontal base blade section with a top, a flat bottom and two substantially parallel opposite sides, each side having a beveled edge on the top of said horizontal base blade section, said horizontal base blade section further having a tip at a distal end of the horizontal base blade section, wherein said horizontal base blade section has a longitudinal axis;
a flange above and substantially parallel to the horizontal base blade section;
a transitioning heel blade section having a curved first end blade section connected to a proximal end of the horizontal base blade section, a second end section connected to the flange, and a flat middle blade section, said curved first end blade section being curved along a transverse axis of said blade so that said flat middle blade section is substantially perpendicular to said horizontal base blade section and said flange, wherein the curved first end blade section and a portion of the middle blade section have beveled sides;
wherein said middle blade section, curved first end blade section, and two substantially parallel sides of said horizontal base are continuously slightly tapered inwardly from the middle blade section to distal end, and wherein the longitudinal axis of the handle extends substantially perpendicular to the longitudinal axis of the horizontal base blade section in a first direction substantially perpendicularly outward from the sides of the horizontal base blade section, and further wherein the longitudinal axis of the handle extends at an upright acute angle to the top of said horizontal base blade section in a second direction different from the first direction which provides for the horizontal base blade section to be substantially parallel to a worked surface when the garden tool is in use, and wherein the beveled edge of one of the two sides is used when the tool is pulled toward the user and the beveled edge of the other one of the two sides is used when the tool is pushed away from the user.

2. The garden tool of claim 1, further comprising an L-shaped tang having a first elongated leg portion separate from and attached to the flange to form the first and second directions, said tang further having a second elongated leg portion substantially at a right angle to the first elongated leg portion, said second elongated leg portion attached to the handle.

3. The garden tool of claim 1, wherein the beveled sides are toward the periphery of the "J".

4. The garden tool of claim 1, wherein the tip of the horizontal base blade section is downwardly beveled.

5. The garden tool of claim 1, wherein the tip of the horizontal base blade section contains a notch.

6. The garden tool of claim 5, wherein the notch is a modified U-shape.

7. The garden tool of claim 5, wherein the notch has inner walls that are perpendicular to the horizontal base blade section.

8. The garden tool of claim 1, wherein the blade has a width that is at least four times a thickness of the blade.

9. The garden tool of claim 1, wherein the flange has a shorter length than the horizontal base blade section.

10. The garden tool of claim 1, wherein the flange has blunt edges.

11. The garden tool of claim 1, wherein the edges of the heel blade section are at least 50% beveled, which give the tool vertical cutting edges.

12. The garden tool of claim 1, wherein the vertical sides of the heel blade section are downwardly tapered.

13. A garden tool comprising:
a handle;
a J-shaped blade formed of a single flat piece, the single flat piece having:
a substantially flat and substantially elongated base blade section with a top surface and a bottom surface, the top surface having two beveled outer side edges opposite from one another, the flat base blade section further having a distal tip having a notch formed at a leading edge of the blade;
a flange portion;
a heel blade section formed at the rear of the base blade section and having one end formed from the base by a bottom curvature blade portion and another end culminating in the flange portion by a top curvature portion; and
a separate one-piece tang having a first elongated leg portion connected to the flange portion of the J-shaped blade and a second elongated leg portion formed at an angle to the first elongated leg portion, said second elongated leg portion connected to said handle;

wherein said single flat piece has opposite sides and is continuously slightly tapered from the heel blade section to the elongated base section to the leading edge of the blade, and wherein one of the beveled outer side edge is used when the tool is pulled toward the user and the other one of the beveled outer side edge is used when the tool is pushed away from the user, wherein the handle has a longitudinal axis and said first elongated leg portion is connected to the flange portion so that the longitudinal axis of the handle is positioned at a right angle to a longitudinal axis of the flat base blade section of the blade in a first direction and at an acute angle to the top surface of the flat base blade section in a second direction different than the first direction.

14. The garden tool of claim 13, wherein the flange has a shorter length than the horizontal base blade section.

15. The garden tool of claim 13, wherein at least 50% of the heel blade section has beveled edges.

16. The garden tool of claim 13, wherein the edges of the heel blade section are downwardly tapered.

17. A garden tool comprising a horizontal blade base with downwardly beveled opposite edges that terminate at a front end in a flat downwardly beveled tip which contains a center notch, said horizontal blade base having a back end with a bottom radiused curvature blade creating a bend substantially perpendicular to the horizontal base blade, said back end and bottom radiused curvature blade having two beveled edges and continuing to a top radiused curvature that brings the rear end of the blade above and substantially parallel to the horizontal base blade, said garden tool further comprising a single piece tang having a first elongated leg and a second elongated leg at an angle to the first elongated leg, wherein the back end and horizontal base blade are continuously slightly tapered inwardly from the back end to the front end, and wherein said flat blade has a longitudinal axis and the first elongated leg is connected to a handle so that the longitudinal axis of said flat blade is substantially perpendicular to a longitudinal axis of the handle in a first direction and the longitudinal axis of the handle is at an acute angle to a top surface of the horizontal base blade in a second direction different than the first direction, and wherein one of the two beveled edges is used when the tool is pulled toward the user and the other one of the two beveled edges is used when the tool is pushed away from the user.

* * * * *